United States Patent [19]

Lewis

[11] 4,201,618

[45] May 6, 1980

[54] APPARATUS FOR CURING ADHESIVELY JOINED FIBER OPTIC ELEMENTS

[75] Inventor: Adolph L. Lewis, La Mesa, Calif.

[73] Assignee: The United States of America as represented by the Secretary of the Navy, Washington, D.C.

[21] Appl. No.: 926,978

[22] Filed: Jul. 21, 1978

[51] Int. Cl.² ..................... B65H 69/02; B65H 69/06
[52] U.S. Cl. ................................. 156/380; 156/158; 156/272; 156/304; 156/502; 219/121 L
[58] Field of Search ............... 156/157, 158, 272, 304, 156/380, 502, 507; 65/4 R; 350/96.20, 96.21, 96.22; 219/121 L; 121 LM

[56] References Cited

U.S. PATENT DOCUMENTS

| 3,769,963 | 11/1973 | Goldman et al. ................ 219/121 L |
| 3,835,912 | 9/1974 | Kristensen et al. .......... 219/121 LM |
| 3,960,531 | 6/1976 | Kohanzadeh et al. ................ 65/4 B |
| 4,002,012 | 1/1977 | Norris et al. ......................... 156/158 |
| 4,021,897 | 5/1977 | Fisli ..................................... 156/272 |
| 4,118,618 | 10/1978 | Gauthier et al. ..................... 156/158 |

Primary Examiner—Michael G. Wityshyn
Attorney, Agent, or Firm—R. S. Sciascia; G. J. Rubens

[57] ABSTRACT

An apparatus and method is provided for adhesive bonding together of fiber optic elements, i.e. fibers, utilizing a light source and an adhesive that will be cured by said light source, the adhesive being irradiated by the light and cured around the entire connection at the same time to provide a uniformly stressed bonded connection.

7 Claims, 4 Drawing Figures

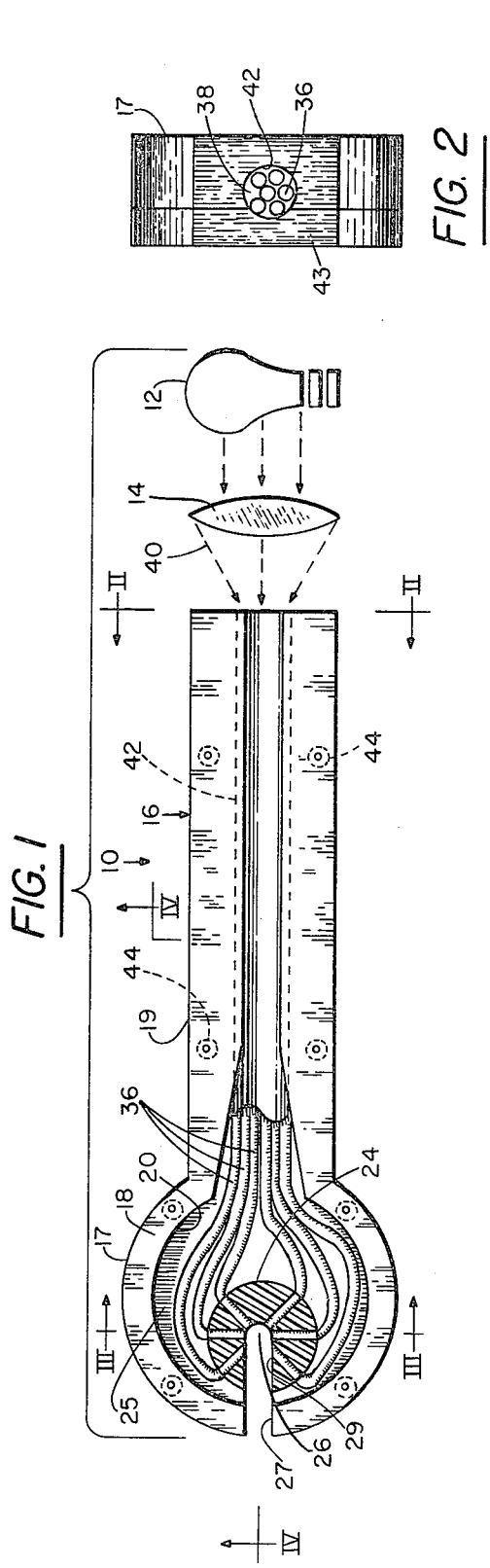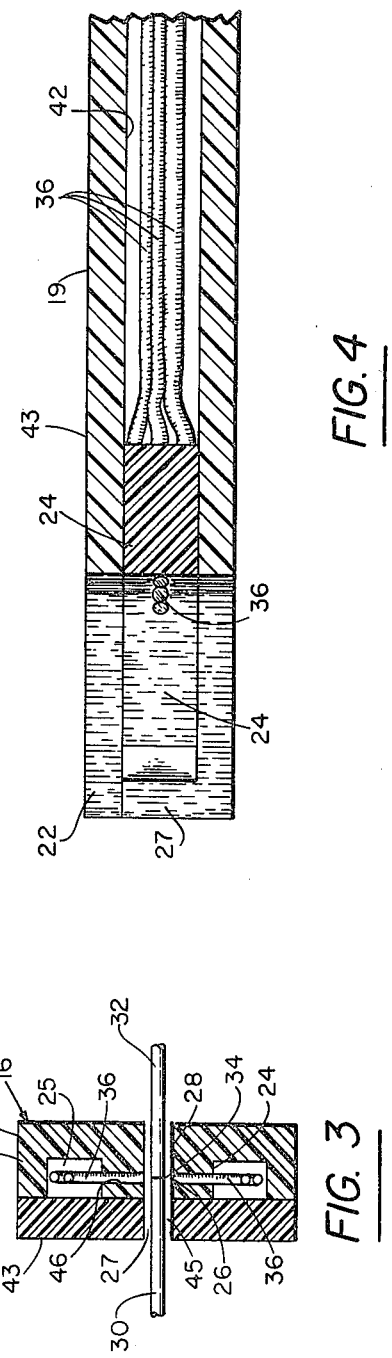

APPARATUS FOR CURING ADHESIVELY JOINED FIBER OPTIC ELEMENTS

BACKGROUND OF THE INVENTION

This invention relates to a method and apparatus for enhancing the quality of the adhesive bonding together of fiber optic elements by use of a light source.

Numerous techniques have been proposed for splicing or connecting fiber optic fibers together or to circuit elements. Some methods employ a fuzing together of the ends of the optical fibers. However, for the most part prior art bonding techniques utilize a chemically setting adhesive, such as an epoxy, or a low melting thermoplastic material. In both techniques, the bonding agent is a transparent material chosen to match, as close as possible, the refractive index of the optical fibers being joined. These prior methods require several hours to cure, making it difficult to maintain the precise coaxial alignment of the fibers during the curing period. These methods also produce a mechanically weak connection when subjected to transverse pressures and vibrations. The apparatus for supporting the optical fibers in longitudinal alignment during the adhesive curing operation forms no part of this invention.

SUMMARY OF THE INVENTION

The novel method and curing apparatus of this invention significantly reduces the time required to cure an adhesively joined fiber optic element connection; improves the quality by providing a stronger joint; and enables the process to be performed in a field environment. The invention preferably utilizes an ultraviolet light source, and an adhesive that is molecularly affected by the ultraviolet light to produce the improved results. The entire surface of the joint, i.e. around the entire perimeter in the case of fibers having the adhesive in position between the respective ends, is irradiated simultaneously by means of a novel apparatus which distributes the light substantially uniform around the entire perimeter joint between the fiber ends. For splicing optical fibers the apparatus has a body portion, preferably wheel-shaped, having a central core opening into which the fiber ends to be joined are positioned. A plurality of radially extending, circumferentially spaced openings, six being illustrated, extend through the body leading to the core opening. Each radial opening is capable of housing one end of a respective fiber optic cable conductor which is oriented perpendicularly to the longitudinal axes of the optical fibers to be joined. The opposite ends of the conductors are bundled together to receive the light rays from the ultraviolet source. A simple complex lens can be positioned between the ultraviolet light source and the bundled ends of the fiber optic conductors to concentrate the light rays within the ends of the cable.

BRIEF DESCRIPTION OF THE DRAWINGS

FIG. 1 is a longitudinal plan view of the base portion of the novel adhesive curing apparatus, partially in section with its cover removed, showing the arrangement of the fiber optic cable conductors.

FIG. 2 is an end view of FIG. 1 taken along line II—II with the cover installed.

FIG. 3 is a cross section view of FIG. 1 taken along line III—III showing the optical fibers being supported in an abutting position with the apparatus.

FIG. 4 is an enlarged partial longitudinal cross-section view of the base of the apparatus taken along line IV—IV of FIG. 1 with the cover attached.

DESCRIPTION OF THE PREFERRED EMBODIMENT

Referring to the drawing where like reference numerals refer to similar parts throughout the figures, there is shown in FIG. 1 the novel curing apparatus 10 in association with preferably an ultraviolet light source 12, such as a conventional mercury arc lamp between which is disposed a light concentrating convex lens 14. The illustrated apparatus is specifically designed to cure the adhesive connection between the ends of single optical fibers, although the invention curing apparatus can be adapted to curing the adhesive connection between other types of fiber optic elements.

Apparatus 10 comprises an open-ended wrench shaped base 16, fabricated of lucite plastic or the like. A circular end 17 of base 16 is formed with an annular rim 18 which forms a hollow circular cavity 20. A disc-shaped light ring 24 is secured to base 16, or made integral therewith, within circular cavity 20. Ring 24 has a smaller diameter than rim 18 to provide an annular space 25 thereabout for a purpose to be described. Ring 24 is constructed with an axial core opening 26 coextensive with a core opening 28 formed in base 16.

Base 16, rim 18, and light ring 24 are constructed with a radially extending slot 27 leading into core openings 26 and 28 which provides a passageway for the entry of optical elements 30 and 32 (FIG. 4) to be spliced. Elements 30 and 32 are for the most part single mode fibers or the like, which hereafter will be referred to generally as fibers. Passageway 27 also enables the insertion of the adhesive between the fiber ends after the apparatus has been positioned over the fibers. Adhesive 34 is chosen preferably from a class capable of being cured by ultraviolet radiation, such as "LOCTITE" manufactured by the Loctite Corp., Newington, Connecticut, Zip Code 06111, identified under Ca. No. 353-18. This adhesive has been found in tests to be particularly suitable because it has a low viscosity enabling a small amount to be applied to the abutting fiber ends, enabling the ends to be adjusted in vertical and horizontal alignment to achieve maximum coupling efficiency before the adhesive sets and the connection cured. In addition "LOCTITE" has substantially the same index of refraction as the fiber glass fibers minimizing Fresnell losses.

Ultraviolet light from source 12 is transmitted to light ring 24 through a plurality of fiber optic conductors 36 compactly bundled together at one end 38 to receive the focused light beam 40 passing through lens 14. A straight support section 19 of base 16 is fabricated with a channel 42 to house the cable run maintained in position by a base cover 43 detachably secured by screws 44 to base 16. An opening 45 is provided in cover 43 coextensive with core openings 26 and 28 to allow passage of the fiber ends to be joined.

Light ring 24 has a plurality of circumferentially spaced, radially disposed drilled holes 46 extending from its outer periphery to core 26. The holes accommodate the other ends of conductors 36 which are epoxied or otherwise secured therein. Cavity 20 provides clearance in body end 17 to enable conductors 36 to be bent for entry into the light ring. The number of conductors 36 needed for any holder depends on the size of the optical elements to be joined, i.e. diameters of the fibers 30 and 32, and the diameters of the light transmitting conductors 36. For joining fibers in the order of 0.0001" in diameter, a total of six equally spaced light transmitting conductors 36 each having a diameter of 0.25" surrounding the entire periphery of the joint have been found adequate to uniformly cure the adhesive.

The curing operation using apparatus 10 is apparent from the drawings. Fibers 30 and 32 are appropriately supported for vertical, horizontal, and rotatable adjustment by precision conventional equipment which usually includes a laser, microscopic objectives and an observation microscope, all of which equipment and technique forms no part of this invention and are not illustrated. Using this equipment with the above mentioned fiber core diameters it is possible to transversely align the fiber cores within ±1 μm to maintain maximum coupling efficiency (with a few percent). When the fiber ends are longitudinally precisely aligned, they should be transversely spaced apart no more than 1 to 2 μm to ensure maximum coupling efficiency.

Apparatus 10 is slipped over the supported and aligned fibers 30 and 32 which pass through slots 22, 27 and 29 and are centered in core 26. If adhesive 34 has not positioned between the closely spaced fiber ends before the apparatus 10 is positioned around the fiber, a small amount of the adhesive can be applied to the gap between the fiber ends through the above described slots. It should be noted that the ends of fibers 30 and 32 to be joined can be a butt joint, as illustrated, or tapered depending on the application. The high liquidity of "LOCTITE" adhesive enables it to be sucked into the small gas existing between the fiber ends by capillary action. In addition, the adhesive has the property of remaining liquid for a sufficient period of time to afford optical checking and correcting of the axial alignment of the supported fibers just prior to and during the curing operation.

With the fibers being supported in proper alignment, energization of light source 12 commences the curing operation. By use of the novel curing apparatus 10, an important feature of the invention resides in the uniform distribution of the light, and its uniform curing effect on the adhesive completely around the connection, in the illustrated embodiment, i.e. 360° around the periphery of the abutting fibers. This arrangement eliminates any non-uniform curing around the connection, and the creation of internal stresses in the joint that otherwise might occur to cause the fibers to become misaligned. Test results of the previously described fiber connection have indicated that the joint be irradiated with the light for a period of 2 to 15 minutes, depending on the age of the adhesive, older adhesive requiring more time. This time period is to be compared with several hours required using the conventional epoxy adhesive and the heat drying techniques.

Avoiding misalignment of the fibers during curing maintains maximum coupling efficiency. Previously described tests indicate that the coupling efficiency using the invention apparatus and method between the fibers was approximately 80%. In the absence of stress, a harder and more durable connection has been achieved. This result is achieved because it is believed that the use of ultraviolet light on the reactive adhesive, such as "LOCTITE" causes a realignment of the molecules of the fibers and adhesive from a chain into a cross linking relationship, thus a chemical bonding is achieved.

Obviously many modifications and variations of the present invention are possible in the light of the above teachings. It is therefore to be understood that within the scope of the appended claims the invention may be practiced otherwise than as specifically described.

What is claimed is:

1. Apparatus for connecting light transmitting fiber optic elements comprising:
   a clear adhesive sensitive to ultraviolet light for positioning between the ends of said elements to be connected;
   a source of ultraviolet light capable of curing said adhesive; and
   means for distributing said light substantially around the perimeter of said ends with said adhesive thereon to cure all areas of the adhesive simultaneously to provide a uniformly stressed fiber optic connection;
   said means comprising a plurality of fiber optic conductors having their ends circumferentially disposed around the ends of the fiber optic elements to be connected, the opposite ends of said conductors being bundled and disposed in the light path from said light source.

2. Apparatus for adhesively connecting together the end of optical fibers comprising:
   a body having an axial bore opening to receive said fibers in longitudinally aligned relationship;
   said body having a plurality of openings circumferentially disposed around said body and extending radially inwardly leading to said axial bore opening;
   a plurality of fiber optic conductors, each having an input end and an output end secured within a respective radial opening;
   a source of ultraviolet light;
   means for introducing the ultraviolet light at the input ends of the fiber optic conductors so that the light is radiated into the body opening in a manner to surround the entire connection to cure the adhesive positioned between the fiber ends.

3. The apparatus of claim 2 wherein said input ends of the conductors are bundled together, and means are provided for focusing the light on the bundled ends.

4. The apparatus of claim 2 wherein said body is wheel-shaped with the openings oriented in a spoke-like configuration.

5. The apparatus of claim 4 wherein said body has a radial slot extending from its periphery to the bore opening, the slot being dimensioned to enable the body to be slipped over the adjacent ends of the optical fibers.

6. The apparatus of claim 5 wherein a housing is provided for enclosing and supporting said body and conductors, said housing having an axial bore opening aligned with the bore opening in the body, and a corresponding radial slot coextensive with the slot in the body.

7. The apparatus of claim 6 wherein said housing is constructed with a support section, and the entire housing provided with a detachable cover member.

* * * * *